United States Patent [19]

Frohnert et al.

[11] Patent Number: 4,792,229

[45] Date of Patent: Dec. 20, 1988

[54] DEVICE FOR MIXING DISPERSE STREAMS BEFORE THEY ENTER A CATALYST BED

[75] Inventors: Heinz Frohnert, Bottrop; Hansjuergen Ullrich, Bochum; Helmut Meier, Essen, all of Fed. Rep. of Germany

[73] Assignee: Veba-Oel Entwicklungs-Gesellschaft mbH, Gelsenkirchen, Fed. Rep. of Germany

[21] Appl. No.: 68,188

[22] Filed: Jun. 30, 1987

[30] Foreign Application Priority Data

Jul. 2, 1986 [DE] Fed. Rep. of Germany ....... 3622177

[51] Int. Cl.4 .............................. B01F 5/00; B01J 8/04
[52] U.S. Cl. .................... 366/336; 422/191; 422/194; 422/195
[58] Field of Search ............... 366/336, 337, 338, 339, 366/340, 341; 422/211, 220, 225, 224, 194, 190, 191, 195; 208/108, 143; 55/257 R, 257 PV

[56] References Cited

U.S. PATENT DOCUMENTS

| | | | |
|---|---|---|---|
| 1,782,824 | 11/1930 | Hechenbleikner | 422/191 |
| 1,927,286 | 9/1933 | Jaeger et al. | 422/220 X |
| 2,278,892 | 4/1942 | Nagle et al. | 422/195 X |
| 2,537,472 | 1/1951 | Massiot | 422/191 |
| 2,917,455 | 12/1959 | Frellick | 422/220 X |
| 3,232,590 | 2/1966 | Eckert | 366/336 X |
| 3,353,924 | 11/1967 | Riopelle | 422/191 |
| 3,502,445 | 3/1970 | Ballard et al. | 422/195 X |
| 3,598,542 | 8/1971 | Carson et al. | 422/194 X |
| 4,526,757 | 7/1985 | Gupta | 422/220 X |

FOREIGN PATENT DOCUMENTS 1965435 5/1971 Fed. Rep. of Germany.

OTHER PUBLICATIONS

"Die Katalytische Druckhydrierung von Kohlen Teeren und Mineraloelen", Dr. Walter Krönig, Springer Verlag, 1950.

Primary Examiner—Harvey C. Hornsby
Assistant Examiner—Scott J. Haugland
Attorney, Agent, or Firm—Oblon, Fisher, Spivak, McClelland & Maier

[57] ABSTRACT

A device for mixing gas and/or vapor streams including liquid components dispersed therein in which the incoming product streams which have been crudely mixed with quench gas, are fed as a single total stream through a collecting plate which covers the reactor cross section, with the streams being collected on the concave side of the plate and passing through it. The streams pass through a mixing pipe which adjoins the outlet of the collecting plate, and the streams further pass through an outer pipe which is configured so as to bring about a reversal of the flow direction. The streams then pass into the space above a distributor device, and are uniformly distributed over the reactor cross section, along with liquid components collected on the distributor, onto a catalyst bed disposed below the distributor.

11 Claims, 2 Drawing Sheets

DEVICE FOR MIXING DISPERSE STREAMS BEFORE THEY ENTER A CATALYST BED

BACKGROUND OF THE INVENTION

1. Field of the Invention

The invention relates to a device for mixing gas and/or vapor streams containing disperse liquid components in a column-type fixed bed reactor.

2. Discussion of the Background

During the catalytic treatment of hydrocarbon products, the sulfur-, nitrogen-, and oxygen-containing compounds in the gas/vapor/liquid mixture being fed are decomposed by catalytic treatment with hydrogen-containing gases. At the same time, cracking reactions take place, and unsaturated compounds are hydrogenated. Overall, the reactions are exothermic, so that the reaction mixture must be cooled between the individual catalyst beds in the reactor, by mixing-in cold gas or quench gas.

Stringent requirements are placed on the apparatus for mixing the reaction product with quench gas after the product leaves a catalyst bed and for redistributing the cooled mixture for feeding to the next lower bed. These requirements relate to the mixing effect; cooling effect; redistributing effect; pressure drop or loss (to be kept minimal); structure volume (to be minimized); and insensitivity to contamination and fouling.

The reasons for these requirements are as follows. The parameters of the quench gas feed are chosen such that even the hottest stream within the mixture flow will be adequately cooled before entering the next bed, whereby inadmissibly high temperatures will not occur in the subsequent conversion. Accordingly, any nonuniform mixing and/or cooling and/or redistribution will increase the amount of quench gas required. Further, parts of the reaction mixture will be overcooled, resulting in a reduced reaction rate for them, and increasing the catalyst volume required to achieve the desired overall conversion. Thus, nonuniform mixing, cooling, and/or redistribution results in higher capital costs (larger reactor and catalyst volumes) as well as higher operating costs (additional quench gas required).

The mixing, cooling, and redistribution effects of a device can generally be improved by increasing the energy expended therefor with the consequence of an increased pressure drop in the mixture stream or by lengthening the mixing and cooling sections with the consequence of greater apparatus volume. Increased pressure drop increases the operating costs, and greater apparatus volume increases the capital costs.

Finally, the reactor system should not be subject to problems arising from contamination in the form of catalyst dust, coke, etc. Every time production must be stopped to clean reactor elements (which are generally not readily accessible), there is a substantial decrease in reactor availability and thus a decrease in profitability.

An apparatus has been proposed for use in fixed bed reactors for mixing and redistributing fluids. See, for example, "Die Katalytische Druckhydrierung von Kohlen, Teeren and Mineraloelen" (Catalytic pressure hydrogenation of coals, tars, and mineral oils). Springer-Verlag, 1950, p. 241. According to this reference, the cold gas is introduced from the top cover through a vertical pip flows from an annular space on the wall of the reactor vessel into the hot gas, and mixes with the hot gas as it travels to the center of the furnace. The flow then goes through a return path, with passage through so-called "cold gas baffles", and is passed on to the next catalyst layer as a mixture with uniform temperature, the passage being through a perforated plate.

In German Pat. No. 1,965,435, a device for mixing two streams before their entry into a bed of solids is described, wherein a mixing chamber with flow guide means and additional distribution plates (or column trays) is provided between individual catalyst layers. In this way, quench gas and product streams are fed to the so-called "quench box" through at least two entrance openings. Intimate mixing and temperature equalization are accomplished in one or more distribution structures or devices, e.g., in a standard spout tray.

Both of these proposals have the serious drawback that there are macroscopically large nonuniformities in the incident product which has been pre-mixed with quench gas, in particular there are so-called "strands" of flow, occurring particularly as a result of partial, local de-mixing of gas, vapor, and liquid in the preceding catalyst bed, and these nonuniformities are not removed by intensive mixing in the individual partial streams, even with very large expense.

SUMMARY OF THE INVENTION

Accordingly, one object of the present invention is to provide a mixing device for mixing gas/vapor streams containing disperse liquid components which does not result in the production of nonuniformities.

Another object of the invention is to provide a mixing device which enables the use of smaller catalyst volumes and less quench gas for the same degree of conversion.

These and other objects which will become apparent from the following specification have been achieved by the present device for mixing gas/vapor streams containing disperse liquid components in a column-type fixed bed reactor, comprising a conical collecting plate covering the entire cross section of the column-type reactor and having an outlet at the apex, wherein the gas/vapor streams are collected on the concave side of the plate, a mixing pipe adjoining the apex of the collecting plate, an outer pipe surrounding the mixing pipe and forming an annular space between the mixing and outer pipes, the outer pipe being closed off below the mixing pipe, whereby the gas/vapor streams passing through the mixing pipe reverse direction and subsequently pass through the annular space, and a disk-shaped distributor disposed in the reactor below the collection plate and above the fixed bed and adjoining the outer pipe and reactor wall, whereby the gas/vapor streams passing through the annular space enter a space bounded by the convex side of said collecting plate, the distributor, the outer pipe and the reactor wall and then pass through the distributor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a horizontal cross section, looking downward, of the baffle system of FIG. 2a.

DETAILED DESCRIPTION OF THE PREFERRED EMBODIMENTS

Figure 1A:
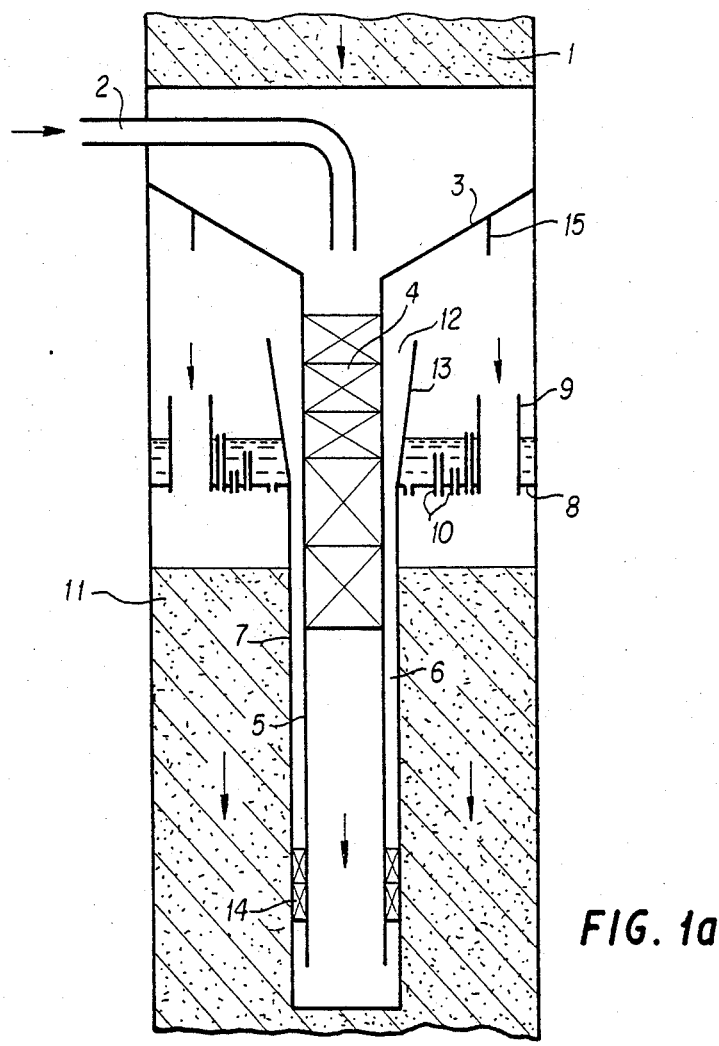
FIG. 1a is a longitudinal cross section of the mixing device of the present invention.

Referring now to the drawings, in the mixing device of the present invention all the incident gas and/or vapor streams above the collecting plate 3 are collected into an overall stream, which flows through a single mixer. Any gas-, liquid-, mixture-, or temperature "strands" are therefor reliably dissipated, followed by redistribution, thereby creating optimal initial conditions for the next catalyst bed downstream.

By selection of suitable mixers having suitable mixing elements, the necessary large phase-interface between the gas and liquid can be produced.

In a preferred embodiment of the mixing device of the present invention, the incoming mixture and the required quench gas are passed through a mixing tube 5 in which appropriate static mixing elements 4 are mounted. With this arrangement, the metered streams to be mixed are guided by the collecting plate 3 into the static mixer, through which the entire flow passes. The mixture leaving the static mixer is redistributed over the reactor cross section with the aid of the distributor 8, with further relaxation of any temperature gradients present.

The inventive device will now be described in more detail with reference to FIGS. 1a and 1b.

The hot reaction mixture, which is a two-phase mixture comprised of gas and vapor with liquid droplets dispersed in the gas and vapor, leaves the catalyst bed 1 in a nonuniform condition. There are various reasons for this, including, notably, wall channeling which occurs in all packed beds. Cold quench gas is supplied through pipe 2, for cooling. A conical collecting plate 3 guides reaction product with liquid and gas flow streams ("strands") into a common mixing pipe 5, along with the quench gas. It is preferred that the outflow from the collecting plate 3 be centrally symmetric with respect to the reactor cross section; and that the same be true of the adjoining mixing pipe 5 as illustrated in FIG. 1a. The mixing elements 4 of static mixer serve to intimately mix all partial streams and "strands", and to disperse the liquid phase as fine droplets. An adjoining (downstream) elongated segment of pipe 5 which is free of interiorly mounted structures may be added in which further temperature equilibration takes place between the gas-vapor mixture and the liquid droplets. This temperature equilibration continues in the annular space 6 between the mixing pipe 5 and the outer pipe 7 which concentrically surrounds pipe 5, so that when the mixture enters the distributor 8 downstream it has globally uniform composition and temperature. The distributor 8, illustrated in FIG. 1a in the form of a spout tray, is furnished with channels 9 of relatively large diameter, for passage of the gas/vapor phase and fine droplets dispersed therein. Large droplets which precipitate after the flow direction reversal of the two-phase mixture (downstream of the annular space 6) combine on the tray into a coherent liquid phase. This liquid phase is then uniformly distributed over the next catalyst bed 11 by means of drain tubes 10 evenly distributed over the cross section of the reactor. The inlet openings of the various drain tubes 10 are disposed at different heights above the tray bottom of the distributor 8. In this way, as the liquid level above the tray bottom rises, additional drain tubes 8 become occupied by draining liquid. Thereby a very wide range of throughputs can be managed, without major changes in the liquid level, on the one hand, and without the irregularities which occur when the flow through the various tubes is too low, on the other hand. This arrangement thus ensures uniform distribution of the gas/vapor phase (the distribution accomplished through channels 9) and of the coherent liquid phase (accomplished through the drain tubes 10), onto the following catalyst bed 11, independently of the liquid content of the mixture.

Figure 1B:
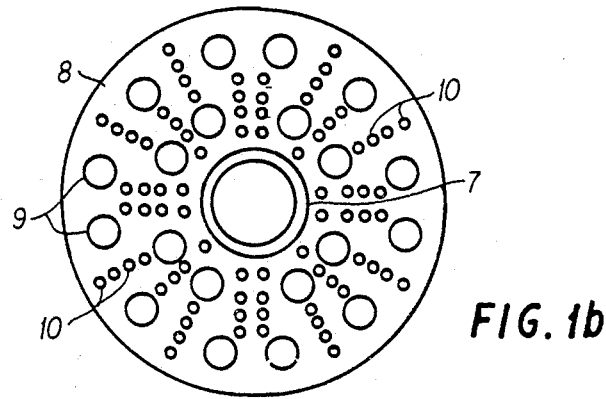
FIG. 1b is a horizontal cross section of a spout tray distributor for redistributing the reaction mixture.

The mixing pipe 5, with the surrounding outer pipe 7, may be extended partially into the catalyst bed 11 a shown in FIG. 1a. The result of this arrangement is a space-saving construction which also achieves improved temperature equilization as a result of the heat exchange between the mixture flowing in the outer pipe 7 and the surrounding region of the catalyst bed 11.

In order to reduce the pressure drop in the structure, the exit section of the annular space 6 can be constructed in the form of a diffusor 12, by attaching a conical extension 13 to the outer pipe 7. In this way, a part of the kinetic energy contained in the mixture stream can be used to recover pressure.

In the case of very high requirements placed on temperature equilization between gas/vapor and liquid, additional mixing elements 14 can be installed in the annular space 6, for redispersing liquid which separates out in the course of the flow reversal. When such requirements are less stringent, these mixing elements 14 are not needed; accordingly, in such cases the elongated free segment of mixing pipe 5 can be dispensed with, because without this segment there still remains a short annular-channel segment 6 for sufficient temperature equilization.

In a preferred embodiment of the invention a sheet metal ring 15 is mounted on the bottom convex side of the collecting plate 3, as a dropping edge. This prevents any substantial amount of liquid droplets from reaching the reactor wall, which may be particularly desirable depending on the design of the seal between the distributor and the reactor wall.

Instead of the spout tray with drain tubes 10 illustrated in FIG. 1 as the distributor, ordinary column plates or sieve trays with simple perforations in the bottom of the plate, for draining precipitated liquid phase, may be employed for redistributing the two-phase mixture. The tradeoff for this simplified structure is possible defects in liquid distribution.

Figure 2A:
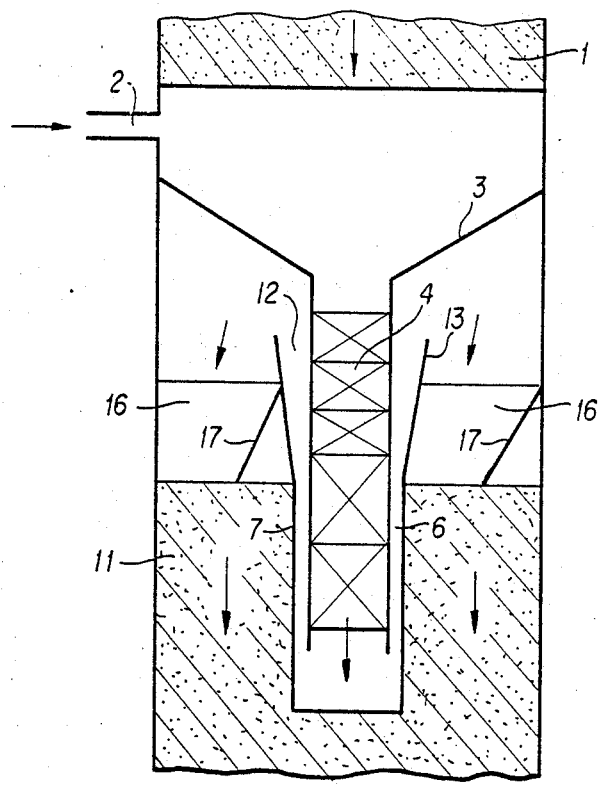
FIG. 2a illustrates a baffle channel system for use as the distributor for redistributing the reaction mixture downstream from a centrally disposed static mixer.
Figure 2B:
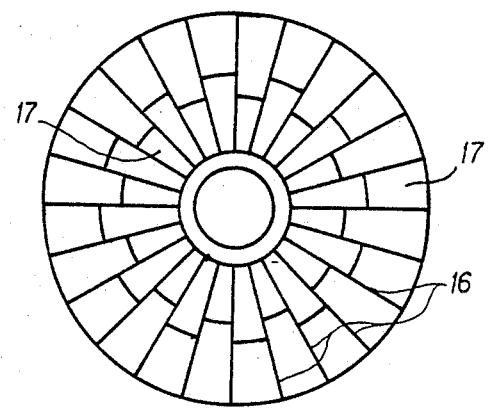

Another embodiment for the distributor for redistributing the two-phase mixture downstream of a centrally disposed static mixer is the baffle channel system illustrate in FIG. 2a. This embodiment has good flow characteristics and is insensitive to contamination. The entire cross section is divided into sectors by vertical radial metal sheets 16. In the individual sectors, inner and outer inclined baffles 17 alternate. The baffles cover the inner and outer parts of the sector area, respectively, so that the mixture flowing through these sectors only impinges on the outer part or inner part, respectively of the next catalyst bed. FIG. 2b is a cross section, looking downward, of the baffle system of FIG. 2a.

The inventive device has the advantage over known devices that the volume of the high-pressure space is reduced, which has a critical effect on the strength requirements for the reactor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for mixing gas/vapor streams containing disperse liquid components in a column-type fixed bed reactor, comprising:
   a concial collecting plate covering the entire cross section of said column-type reactor and having an outlet at the apex thereof, wherein the gas/vapor streams are collected on the concave side of said plate,
   a mixing pipe adjoining the apex of said collecting plate,
   an outer pipe surrounding said mixing pipe and forming an annular space between said mixing and outer pipes, said outer pipe being closed-off below said mixing pipe, whereby the gas/vapor streams passing through said mixing pipe reverse direction and subsequently pass though said annular space,
   a disk-shaped distributor disposed in the reactor below said collecting plate and above said fixed bed and adjoining said outer pipe and the reactor wall,
   a diffusor for reducing the pressure drop within said mixing device, said diffuser adjoining said outer pipe above said distributor, said diffusor comprising an open upwardly facing conical segment, and
   an annular space bounded by the convex side of said collecting plate, said distributor, said diffusor and the reactor wall, whereby the gas/vapor streams pass through said annular space and then pass through said distributor.

2. The device of claim 1, further comprising static mixing elements located in said mixing pipe.

3. The device of claim 1, wherein the apex of said collecting plate and said mixing pipe are centrally symmetric with respect to the reactor cross section.

4. The device of claim 1, further comprising an elongated pipe segment adjoining said mixing pipe.

5. The device of claim 1, wherein a portion of said mixing pipe and said outer pipe extend into said fixed bed.

6. The device of claim 1, further comprising static mixing elements mounted in said annular space.

7. The device of claim 1, wherein said distributor is a sieve tray, said tray having perforations for passage of liquid and tubes for passage of gas.

8. The device of claim 1, wherein said distributor comprises a cylindrical baffle channel system comprising a plurality of sectors having inner and outer parts, said baffle system comprising vertical radial metal sheets defining the sectors of said channel system and alternating inclined baffles between said vertical metal sheets, said baffles alternately covering the inner and outer parts of said sectors.

9. The device of claim 1, wherein said distributor comprises a spout tray with drain tubes for the passage of liquid and channels for the passage of gases.

10. The device of claim 9, wherein the inlet openings of said drain tubes are disposed at different heights above said spout tray.

11. The device of claim 1, further comprising a metal ring adjoining the convex side of said collecting plate, whereby said metal ring functions as a dropping edge.

* * * * *